United States Patent [19]
Tomiyama

[11] Patent Number: 5,378,560
[45] Date of Patent: Jan. 3, 1995

[54] NONAQUEOUS SECONDARY BATTERY

[75] Inventor: Hideki Tomiyama, Kanagawa, Japan

[73] Assignee: Fuji Photo Film Co., Ltd., Kanagawa, Japan

[21] Appl. No.: 183,335

[22] Filed: Jan. 19, 1994

[30] Foreign Application Priority Data

Jan. 21, 1993 [JP] Japan .................................. 5-008434
May 11, 1993 [JP] Japan .................................. 5-109383
Jul. 19, 1993 [JP] Japan .................................. 5-198826

[51] Int. Cl.$^6$ ............................................ H01M 4/62
[52] U.S. Cl. ...................................... 429/217; 429/194; 429/218
[58] Field of Search .............. 429/217, 212, 213, 215, 429/194, 218

[56] References Cited

U.S. PATENT DOCUMENTS

| | | | |
|---|---|---|---|
| 4,814,242 | 3/1989 | Maxfield et al. | 429/217 |
| 4,980,250 | 12/1990 | Takahashi et al. | 429/194 |
| 5,004,657 | 4/1991 | Yoneda et al. | 429/217 X |
| 5,262,255 | 11/1993 | Ito et al. | 429/217 |

FOREIGN PATENT DOCUMENTS

0567149A1 4/1993 European Pat. Off. .

*Primary Examiner*—Anthony Skapars
*Attorney, Agent, or Firm*—Sughrue, Mion, Zinn, Macpeak & Seas

[57] ABSTRACT

A nonaqueous secondary battery containing at least one metal oxide as a positive electrode active material, at least one metal oxide as a negative electrode active material, and an ion conductive electrolyte is disclosed, in which the positive electrode material mixture and/or the negative electrode material mixture contain(s) a binder selected from a carboxyl-modified styrene-butadiene copolymer, a polymer of formula (I), and a polymer of formula (II):

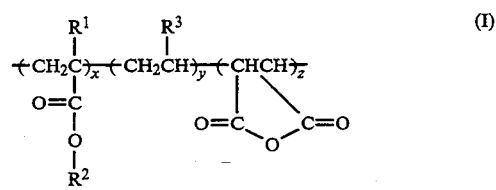

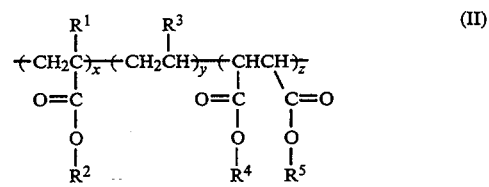

16 Claims, 1 Drawing Sheet

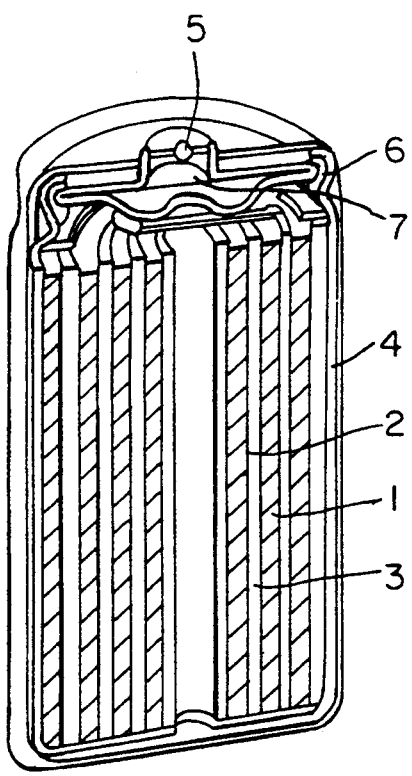

5,378,560

NONAQUEOUS SECONDARY BATTERY

FIELD OF THE INVENTION

This invention relates to a chemical battery and more particularly to a nonaqueous secondary battery, the electrode active material of which is prevented from falling off by means of a binder to improve charge and discharge cycle characteristics.

BACKGROUND OF THE INVENTION

A binder for an electrode active material in an aqueous electrolyte of a manganese dry cell, an alkali dry cell, a nickel-cadmium secondary battery, etc. includes starch, polyvinyl alcohol and carboxymethyl cellulose (see JP-A-1-175171, JP-A-1-105471, JP-A-51-5538, and JP-A-50-26500, the term "JP-A" as used herein means an "unexamined published Japanese patent application"); hydroxypropyl cellulose (see JP-A-63-24859 and JP-A-54-49541); regenerated cellulose (see JP-A-61-91872); polyvinyl chloride, polyvinyl pyrrolidone, and so forth. In a nonaqueous electrolyte of a lithium cell, etc., Teflon is generally used as a binder (see *DENCHI Handbook*, Denki Shoin (1980)).

In secondary batteries in which a positive or negative electrode repeatedly undergoes expansion and contraction on charging and discharging, the active material or conducting agent is apt to fall off to shorten the charge and discharge cycle life. In order to prevent this, proper selection of a binder is of particular importance. However, the above-mentioned conventional binders are unsatisfactory for preventing an active material and the like from falling off.

JP-A-3-108263 discloses a binder for a positive electrode for prevention of fall-off of an active material, making mention of an improvement in charge and discharge cycle life. However, the binder disclosed has poor affinity to an aqueous or nonaqueous electrolyte and attains a low utilization of the active material, and the charge and discharge cycle life reached is still insufficient. Besides an increase of the binder in amount is accompanied by a considerable rise in internal resistivity.

Use of a rubbery high polymer (i.e., an elastomer) as a binder for a negative electrode of a secondary battery has been proposed as described in U.S. Pat. No. 4,814,242 and JP-A-4-255670. However, any of the recommended binders exhibits poor adhesion to a collector, such as a metallic foil, so that the active material easily falls off.

Thus, a charge and discharge cycle life and a utilization of an active material (i.e., discharge capacity) conflict to each other, and it has been demanded to develop a binder by which both of these conflicting requirements may be met.

In a lithium battery as a primary battery, a spiral structure made of a sheet electrode has been adopted in order to reduce the internal resistivity. Some lithium batteries use a sheet of a metallic foil as a collector so as to cope with heavy load discharge. However, cases have been sometimes met with, in which a film of an active material coated on the collector with weak adhesion falls off the collector during assembly operation, such as sheet rolling, resulting in an increased rejection rate. From this viewpoint, a binder is ought to improve adhesion between an active material and a collector. For example, a binder for improving the adhesion is disclosed in JP-A-3-222258, but the performance properties are still insufficient.

On the other hand, with the recent tendency toward size reduction of electronic equipment, such as a portable phone, a personal computer and a video camera, secondary batteries of high energy density have been demanded. To meet the demand, nonaqueous secondary batteries have been extensively studied.

Negative electrode active materials for nonaqueous secondary batteries typically include metallic lithium and lithium alloys. The problem associated with these active materials is that metallic lithium dendrically grows during charging and discharging to cause an internal short circuit, involving a danger of ignition because of high activity of the dendrical metal per se. To solve the problem, a calcined carbonaceous material capable of intercalating and deintercalating lithium has recently been developed for practical use. Although this carbonaceous material is superior for its relatively reduced danger of ignition and high charge and discharge capacity, it has electrical conductivity per se so that metallic lithium is sometimes precipitated on the carbonaceous material at the time of overcharge or rapid charge. It eventually follows that lithium dendrically grows thereon. This problem has been dealt with by altering a charger or reducing the amount of the positive electrode active material to prevent overcharge. Where the latter solution is adopted, however, the limited amount of the active material leads to a limited discharge capacity. Further, the carbonaceous material has a relatively low density and therefore a low discharge capacity per unit volume. Thus, the discharge capacity is limited by both the amount of the active material and the capacity per unit volume.

In addition to metallic lithium, lithium alloys and the above-mentioned carbonaceous material, active materials so far proposed include the oxides for a negative electrode described in EP-A-567149 and the oxides for a positive electrode described in U.S. Pat. Nos. 4,302,518 and 4,507,371.

SUMMARY OF THE INVENTION

An object of the present invention is to provide a nonaqueous secondary battery having a high discharge potential, a high discharge capacity (high energy density), a long charge and discharge cycle life, and high safety.

The above object of the present invention is accomplished by using a specific polymer as a binder for a negative electrode and/or a positive electrode.

The present invention relates to a nonaqueous secondary battery comprising a positive electrode active material, a negative electrode active material, and an electrolyte having ionic conductivity, said battery containing, as a binder, a carboxyl-modified styrene-butadiene copolymer or a polymer represented by formula (I) or (II) shown below in the positive electrode material mixture thereof and/or the negative electrode material mixture thereof and using at least one chalcogen compound of a transition metal as a positive electrode active material and at least one chalcogen compound of a transition metal as a negative electrode active material:

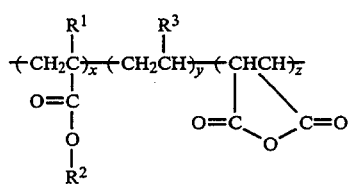
(I)

wherein $R^1$ represents a hydrogen atom or an alkyl group having 1 or 2 carbon atoms; $R^2$ represents an alkyl group having from 1 to 12 carbon atoms, an aryl group having from 6 to 12 carbon atoms or an aralkyl group having from 7 to 13 carbon atoms; $R^3$ represents a hydrogen atom or an alkyl group having 1 or 2 carbon atoms; x is from 5 to 40% by weight; y is from 40 to 90% by weight; and z is from 1 to 20% by weight; with the sum of x, y, and z being 100% by weight:

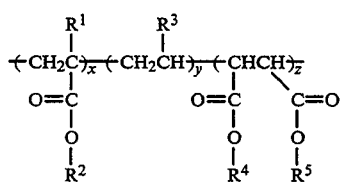
(II)

wherein $R^1$, $R^2$, $R^3$, x, y, and z are as defined above; $R^4$ and $R^5$ each represent a hydrogen atom, an alkyl group having from 1 to 12 carbon atoms, an aryl group having from 6 to 12 carbon atoms or an aralkyl group having from 7 to 13 carbon atoms.

BRIEF DESCRIPTION OF THE DRAWING

The figure is a cross section of a general cylindrical battery.

DETAILED DESCRIPTION OF THE INVENTION

The carboxyl-modified styrene-butadiene copolymer which can be used as a binder in the present invention is a generally known styrene-butadiene copolymer (SBR) having introduced thereto a carboxyl group. Modification of SBR with a hydroxyl group can be conducted by (a) copolymerizing styrene and butadiene together with an ethylenically unsaturated carboxylic acid, e.g., acrylic acid, methacrylic acid, itaconic acid or maleic anhydride, as a copolymerizable third monomer, (b) using a polymerization initiator or chain transfer agent containing a carboxyl group to introduce the carboxyl group to the polymer terminal, or (c) subjecting an unmodified SBR to a high polymer reaction to introduce a carboxyl group to the main chain, side chain or terminal thereof.

The carboxyl content of the carboxyl-modified styrene-butadiene copolymer preferably ranges from 0.01 to 7 mmol, and more preferably from 0.1 to 5 mmol, per gram. A copolymerization ratio of styrene and butadiene is preferably from 10:90 to 70:30, and more preferably from 20:80 to 60:40, by weight.

The copolymer can be prepared by either emulsion polymerization or solution polymerization. The copolymer may have any of a random structure, a grafted structure, a block structure, and a symmetric block structure. Specific but non-limiting examples of the carboxyl-modified styrene-butadiene copolymer are shown below under formula numbers (A-1) to (A-20). Formula number (B-1) is for a comparative polymer.

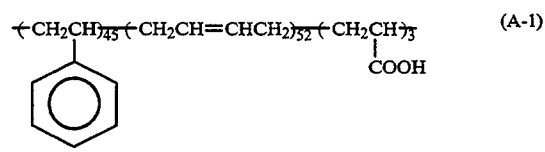
(A-1)

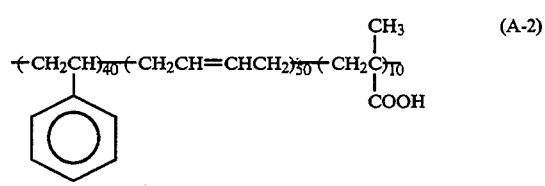
(A-2)

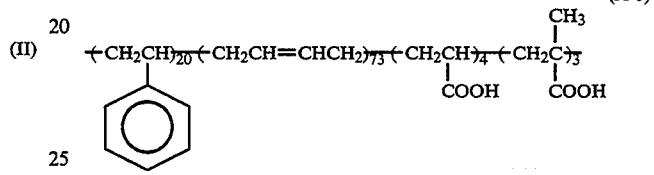
(A-3)

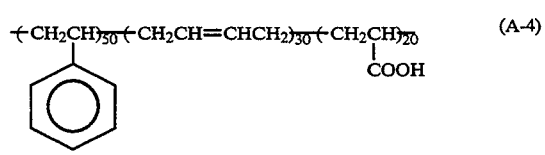
(A-4)

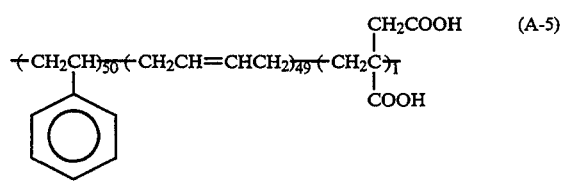
(A-5)

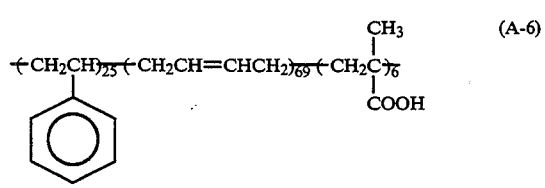
(A-6)

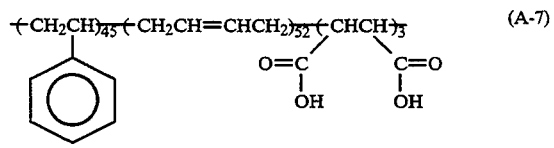
(A-7)

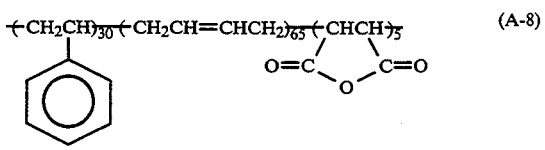
(A-8)

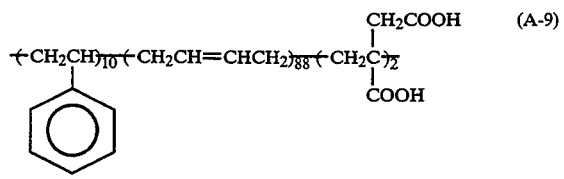
(A-9)

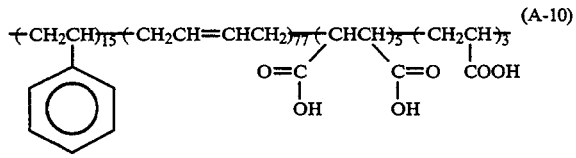 (A-10)

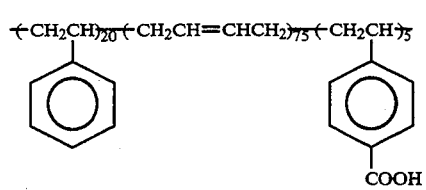 (A-11)

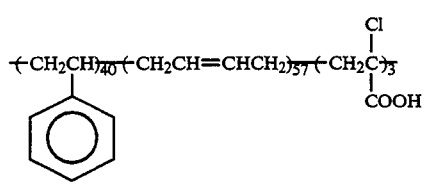 (A-12)

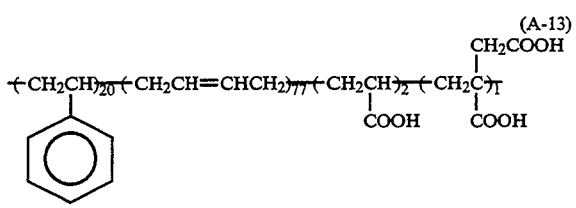 (A-13)

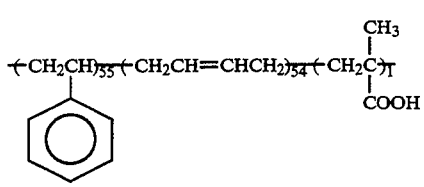 (A-14)

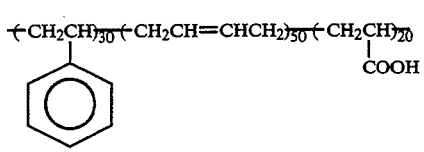 (A-15)

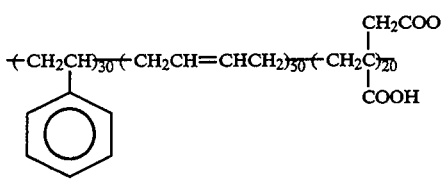 (A-16)

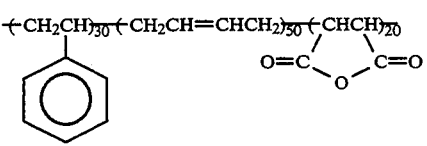 (A-17)

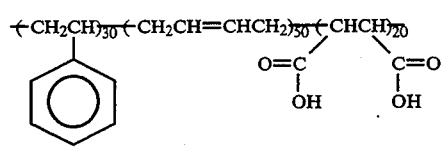 (A-18)

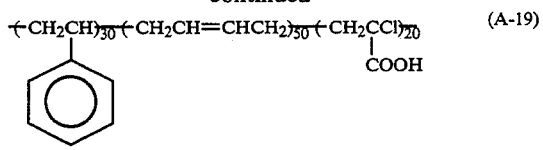 (A-19)

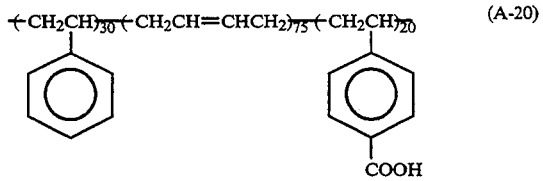 (A-20)

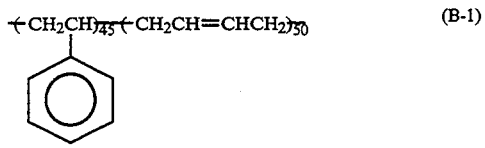 (B-1)

The above-mentioned carboxyl-modified styrene-butadiene copolymer is commercially available under a trade name, e.g., of Nipol 2570X5 and LX407S, both produced by Nippon Zeon Co., Ltd.

If desired, the carboxyl-modified styrene-butadiene copolymer may be used in combination with one or more of other known polymers, such as carboxymethyl cellulose, sodium polyacrylate, hydroxyethyl cellulose, polyvinyl alcohol, polyvinyl pyrrolidone, polyethylene oxide, and alginic acid.

In formulae (I) and (II) representing the polymers which can be used as a binder in the present invention, x is preferably from 5 to 35% by weight, and more preferably from 5 to 30% by weight; y is preferably from 50 to 80% by weight, and more preferably from 60 to 80% by weight; and z is preferably from 2 to 15% by weight, and more preferably from 2 to 10% by weight. $R^1$ is preferably a hydrogen atom or a methyl group; $R^2$ is preferably a methyl group, an ethyl group, an n-butyl group, an n-hexyl group, an n-dodecyl group, an isobutyl group, a phenyl group, a naphthyl group or a benzyl group; and $R^3$ is preferably a hydrogen atom, a methyl group or an ethyl group.

In formula (II), $R^4$ and $R^5$ are each preferably a hydrogen atom, a methyl group, an ethyl group, an n-butyl group, an n-hexyl group, an n-dodecyl group, an isobutyl group, a phenyl group, a naphthyl group or a benzyl group. $R^4$ and $R^5$ may be the same or different.

Specific examples of the polymer of formula (I) and the polymer of formula (II) which are preferably used in the present invention are shown below for illustrative purposes only but not for limitation.

Polymer of formula (I):

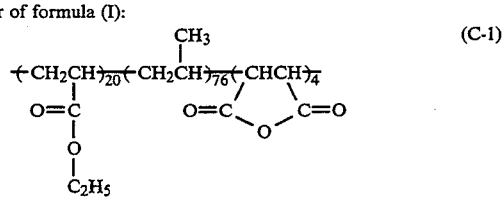 (C-1)

-continued
Polymer of formula (I):
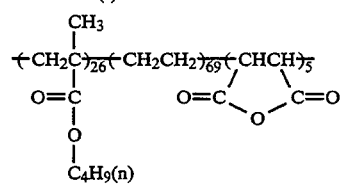 (C-2)
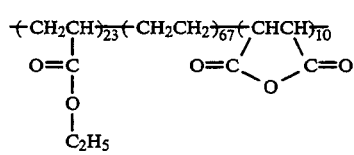 (C-3)
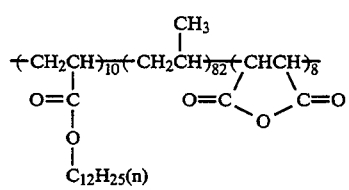 (C-4)
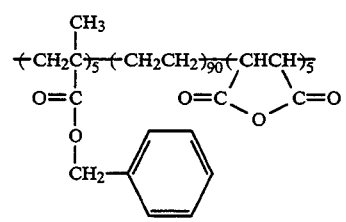 (C-5)
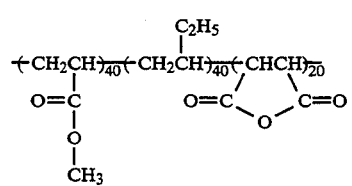 (C-6)
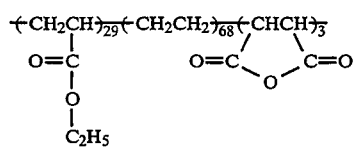 (C-7)
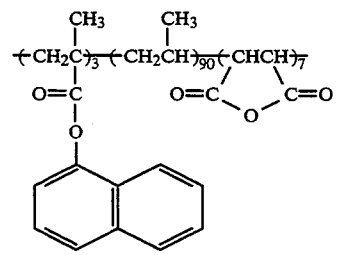 (C-8)
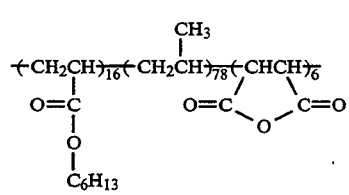 (C-9)
-continued
Polymer of formula (I):
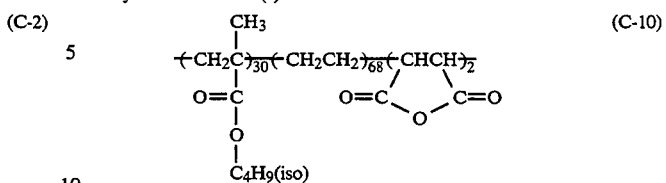 (C-10)
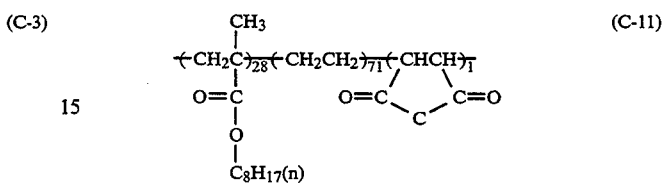 (C-11)
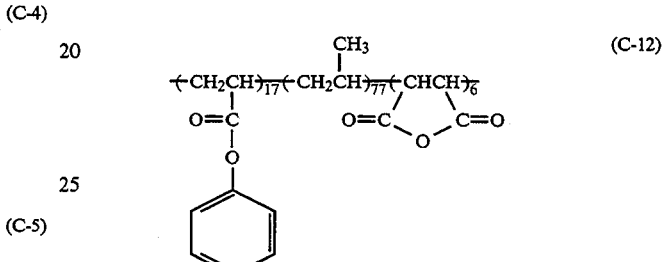 (C-12)
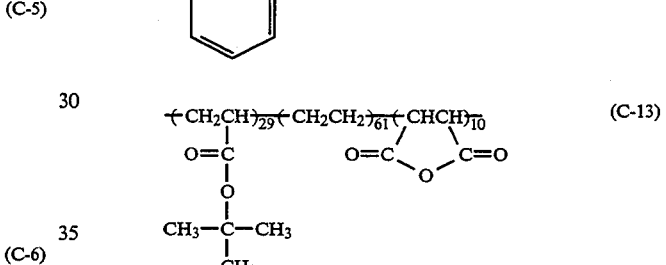 (C-13)
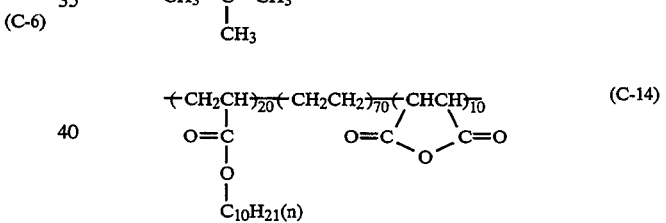 (C-14)
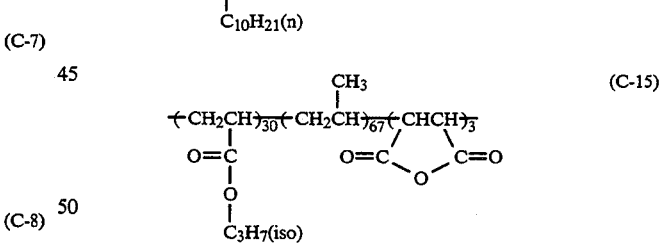 (C-15)
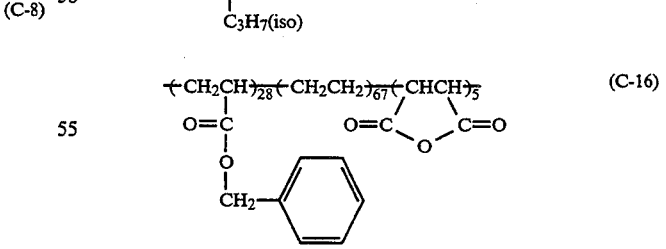 (C-16)
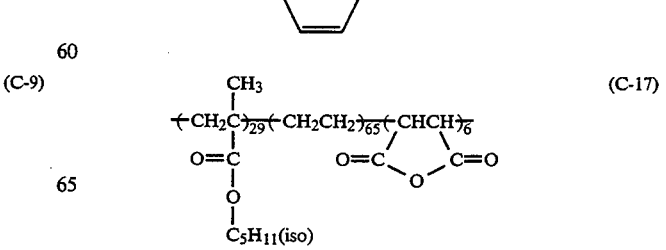 (C-17)

Polymer of formula (I):
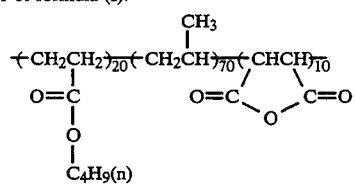 (C-18)
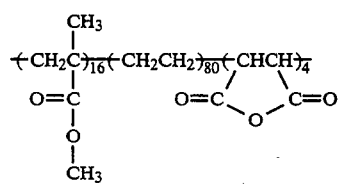 (C-19)
Polymer of formula (II):
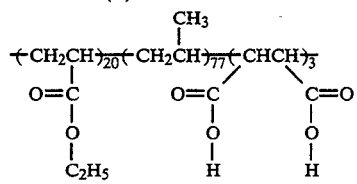 (D-1)
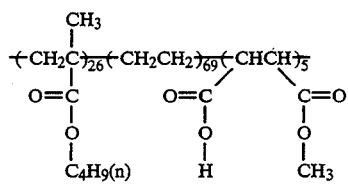 (D-2)
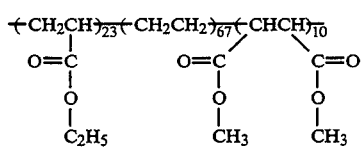 (D-3)
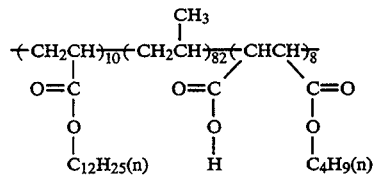 (D-4)
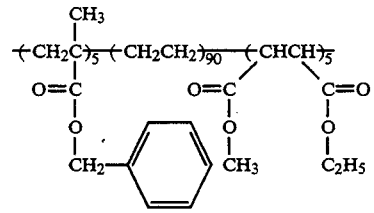 (D-5)
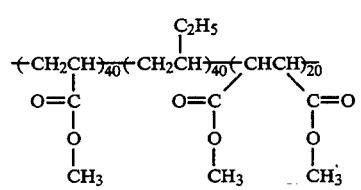 (D-6)
Polymer of formula (II):
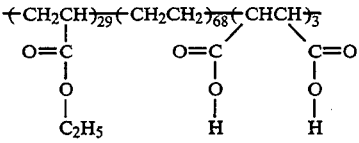 (D-7)
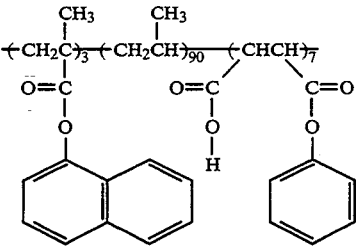 (D-8)
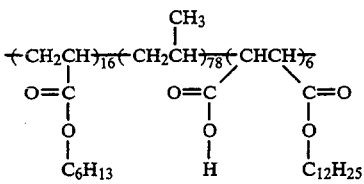 (D-9)
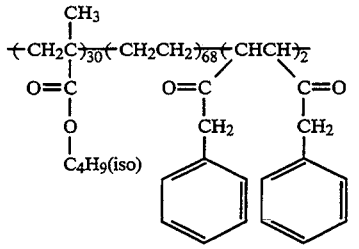 (D-10)
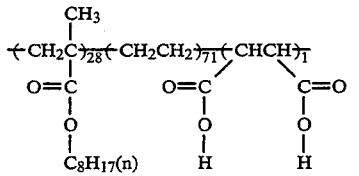 (D-11)
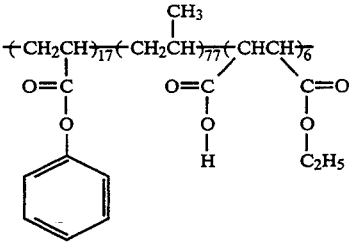 (D-12)
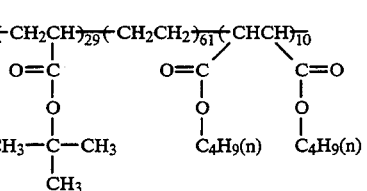 (D-13)
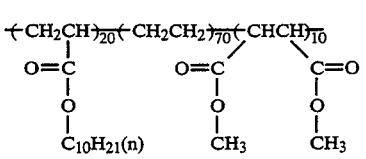 (D-14)

Polymer of formula (II):

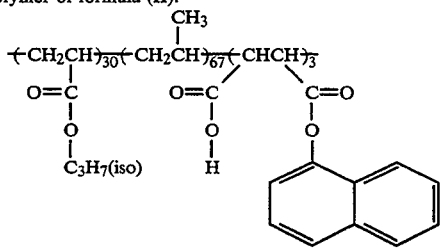

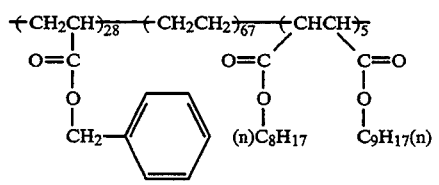

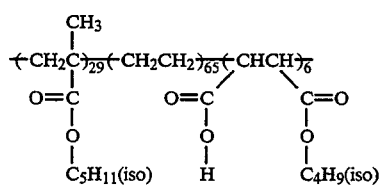

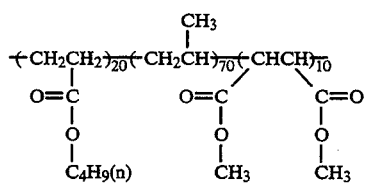

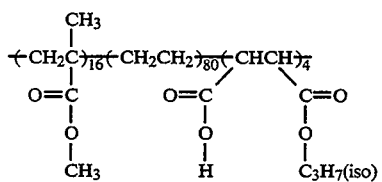

The binder according to the present invention is preferably used in an amount of from 0.5 to 30% by weight, and more preferably from 1 to 20% by weight, based on the positive or negative electrode material mixture.

The transition metal chalcogen compound which can be used as a positive or negative electrode active material preferably includes an oxide or sulfide of a transition metal. More preferred is a lithium-containing transition metal oxide.

In particular, an oxide containing lithium and at least one of titanium, vanadium, chromium, manganese, iron, cobalt, nickel, copper, molybdenum and tungsten is preferred as a positive electrode active material. Such a lithium-containing oxide preferably includes those represented by formula $Li_xM_yO_2$, wherein M represents at least one of Ti, V, Cr, Mn, Fe, Co, Ni, Mo, and W, and preferably at least one of V, Mn, Fe, Co, and Ni; x is from 0.6 to 2.1; y is 1 or 2; and z is from 1.5 to 5.

Of the lithium-containing oxide represented by the above formula, preferred are $Li_xCoO_2$, $Li_xCo_aNi_{1-a}O_2$, $Li_xCo_bV_{1-b}O_z$, $Li_xCo_bFe_{1-b}O_z$, $Li_xMn_2O_4$, $Li_xMn_bCo_{2-b}O_z$, $Li_xMn_bNi_{2-b}O_z$, $Li_xMn_bV_{2-b}O_z$, and $Li_xMn_bFe_{1-b}O_z$, wherein x is from 0.7 to 1.1, and preferably from 0.7 to 1.04; a is form 0.1 to 0.9; b is from 0.8 to 0.98; and z is from 1.5 to 5. More preferred of them are $Li_xCoO_2$, $Li_xCo_aNi_{1-a}O_2$, $Li_xMn_2O_4$, and $Li_xCo_bV_{1-b}O_z$, wherein x is from 0.7 to 1.1, and particularly from 0.7 to 1.04; a is from 0.1 to 0.9; b is from 0.9 to 0.98; and z is from 2.02 to 2.3.

On the other hand, an oxide containing lithium and at least one of titanium, vanadium, chromium, manganese, iron, cobalt, nickel, copper, niobium, molybdenum and tungsten is preferred as a negative electrode active material. Such a lithium-containing oxide preferably includes those represented by formula $Li_eM_fO_g$, wherein M represents at least one of Ti, V, Cr, Mn, Fe, Co, Ni, Nb, Mo, and W, and preferably at least one of V, Mn, Fe, Co, and Ni; e is from 0.4 to 11; f is 1 or 2; and g is from 1 to 5.5.

More preferred of the lithium-containing oxide represented by the above formula are those represented by formula $Li_pM_qV_{1-q}O_r$, preferably $Li_pCo_qV_{1-q}O_r$, wherein p is from 0.4 to 11, and more preferably from 0.8 to 7; q is from 0 to 1, and more preferably from 0.02 to 0.98; and r is from 1.2 to 5.5, and more preferably from 1.3 to 4.5. Most preferred are those wherein p is from 0.8 to 7; q is from 0.1 to 0.9; and r is from 1.3 to 4.5.

The above-mentioned positive or negative electrode active material is prepared by (1) chemically inserting lithium into a transition metal oxide, (2) electrochemically inserting lithium into a transition metal oxide, or (3) calcining a lithium compound and a transition metal compound. The chemical insertion of lithium into a transition metal oxide is preferably carried out by reacting metallic lithium, a lithium alloy or butyl lithium with a transition metal oxide.

The positive or negative electrode active material is preferably prepared by process (3), i.e., calcination of a mixture of a lithium compound and a transition metal compound.

The above-mentioned positive electrode active material and the negative electrode active material can be obtained by calcining a mixture of a lithium compound, such as an oxygen compound, an oxyacid salt or a halide, and a transition metal compound, such as an oxide, salt or complex of a di- to hexavalent transition metal.

Examples of suitable lithium compounds include lithium hydroxide, lithium carbonate, lithium nitrate, lithium sulfate, lithium sulfite, lithium phosphate, lithium tetraborate, lithium chlorate, lithium perchlorate, lithium thiocyanate, lithium formate, lithium acetate, lithium oxalate, lithium citrate, lithium lactate, lithium tartrate, lithium pyruvate, lithium trifluoromethanesulfonate, lithium hexafluorophosphate, lithium fluoride, lithium chloride, lithium bromide, and lithium iodide.

Examples of suitable transition metal compounds include $TiO_2$, lithium titanium fluoride, acetylacetonatotitanium oxide, titanium tetrachloride, titanium tetraiodide, lithium titanium oxalate, $VO_d$ (wherein d is from 2 to 2.5), a lithium compound of $VO_d$, vanadium hydroxide, ammonium metavanadate, ammonium orthovanadate, ammonium pyrovanadate, vanadium oxysulfate, vanadium oxytrichloride, vanadium tetrachloride, lithium chromate, ammonium chromate, cobalt chromate, acetylacetonatochromium, $MnO_2$, $Mn_2O_3$, manganese hydroxide, manganese carbonate, manganese nitrate, manganese sulfate, ammonium manganese sulfate, manganese sulfite, manganese phosphate, manganese borate, manganese chlorate, manganese perchlorate, manganese thiocyanate, manganese formate, manganese acetate, manganese oxalate, manganese citrate, manganese lactate, manganese tartrate, manganese stearate, manganese fluoride, manganese chloride, manganese bromide, manganese iodide, acetylacetonatomanganese, iron (II) or (III) oxide, iron (II) iron (III) oxide, iron (II) or (III) hydroxide, iron (II) or (III) chloride, iron (II) or (III) bromide, iron (II) or (III) iodide, iron (II) or (III) sulfate, ammonium iron (II) or (III) sulfate, iron (II) or (III) nitrate, iron (II) or (III) phosphate, iron perchlorate, iron chlorate, iron (II) or (III) acetate, iron (II) or (III) citrate, ammonium iron (II) or (III) citrate, iron (II) or (III) oxalate, ammonium iron (II) or (III) oxalate, $Co_2O_3$, $Co_3O_4$, $LiCoO_2$, cobalt carbonate, cobalt sulfate, cobalt nitrate, cobalt sulfite, cobalt perchlorate, cobalt thiocyanate, cobalt oxalate, cobalt acetate, cobalt fluoride, cobalt chloride, cobalt bromide, cobalt iodide, hexaamminecobalt complex salts (salt with sulfuric acid, nitric acid, perchloric acid, thiocyanic acid, oxalic acid, acetic acid, fluorine, chlorine, bromine or iodine), nickel oxide, nickel hydroxide, nickel carbonate, nickel sulfate, nickel nitrate, nickel fluoride, nickel chloride, nickel bromide, nickel iodide, nickel formate, nickel acetate, acetylacetonatonickel, copper (I) or (II) oxide, copper hydroxide, copper sulfate, copper nitrate, copper phosphate, copper fluoride, copper chloride, copper ammonium chloride, copper bromide, copper iodide, copper formate, copper acetate, copper oxalate, copper citrate, niobium oxychloride, niobium pentachloride, niobium pentaiodide, niobium monoxide, niobium dioxide, niobium trioxide, niobium pentoxide, niobium oxalate, niobium methoxide, niobium ethoxide, niobium propoxide, niobium butoxide, lithium niobate, $MoO_3$, $MoO_2$, $LiMo_2O_4$, molybdenum pentachloride, ammonium molybdate, lithium molybdate, ammonium phosphomolybdate, acetylacetonatomolybdenum oxide, $WO_3$, tungstic acid, ammonium tungstate, and ammonium phosphotungstate.

Preferred of these transition metal compounds are $TiO_2$, lithium titanium oxalate, $VO_d$ (wherein d is from 2 to 2.5), a lithium compound of $VO_d$, ammonium metavanadate, $MnO_2$, $Mn_2O_3$, manganese hydroxide, manganese carbonate, manganese nitrate, ammonium manganese sulfate, manganese acetate, manganese oxalate, manganese citrate, iron (II) or (III) oxide, iron (II) iron (III) oxide, iron (II) or (III) hydroxide, iron (II) or (III) acetate, iron (II) or (III) citrate, ammonium iron (II) or (III) citrate, iron (II) or (III) oxalate, ammonium iron (II) or (III) oxalate, $Co_2O_3$, $Co_3O_4$, $LiCoO_2$, cobalt carbonate, cobalt oxalate, cobalt acetate, nickel oxide, nickel hydroxide, nickel carbonate, nickel sulfate, nickel nitrate, nickel acetate, copper (I) or (II) oxide, copper hydroxide, copper acetate, copper oxalate, copper citrate, $MoO_3$, $MoO_2$, $LiMo_2O_4$, and $WO_3$.

Suitable combinations of a lithium compound and a transition metal compound include a combination of lithium hydroxide, lithium carbonate, $VO_d$ (wherein d is from 2 to 2.5) or a lithium compound of $VO_d$ and ammonium metavanadate, $MnO_2$, $Mn_2O_3$, manganese hydroxide, manganese carbonate, manganese nitrate, iron (II) or (III) oxide, iron (II) iron (III) oxide, iron (II) or (III) hydroxide, iron (II) or (III) acetate, iron (II) or (III) citrate, ammonium iron (II) or (III) citrate, iron (II) or (III) oxalate, ammonium iron (II) or (III) oxalate, $Co_2O_3$, $Co_3O_4$, $LiCoO_2$, cobalt carbonate, cobalt sulfate, cobalt nitrate, nickel oxide, nickel hydroxide, nickel carbonate, nickel sulfate, nickel nitrate, nickel acetate, copper (I) or (II) oxide, $MoO_3$, $MoO_2$, $LiMo_2O_4$ or $WO_3$.

If desired, the mixture to be calcined may contain a compound increasing ionic conductivity, such as a compound containing $Ca^{2+}$ (e.g., calcium carbonate, calcium chloride, calcium oxide, calcium hydroxide, calcium sulfate, calcium nitrate, calcium acetate, calcium oxalate, calcium citrate or calcium phosphate), or an amorphous substance-forming agent containing P, B, Si, etc. (e.g., $P_2O_5$, $Li_3PO_4$, $H_3BO_3$ or $SiO_2$). The mixture may further contain a compound containing an alkali metal ion, e.g., Na, K or Mg, and/or Sn, Al, Ga, Ge, Ce, In, Bi, etc. (e.g., an oxide, hydroxide, carbonate or nitrate of the element). It is preferable to incorporate calcium carbonate or $P_2O_5$ into the mixture. While not limiting, the amount of these additives preferably ranges from 0.2 to 10 mol %.

Calcination is carried out in air or an inert gas, e.g., nitrogen or argon, at a temperature at which the lithium component and the transition metal component are decomposed and melted, for example from 250° to 2000° C., and preferably from 350° to 1500° C.

The chemical formula of the resulting calcined product can be decided by induction coupled plasma (ICP) emission spectroscopic analysis, and more conveniently from the difference in weight of the powder before and after calcination.

The oxide to be used in the present invention may be either crystalline or amorphous but is preferably crystalline. The terminology "amorphous" as used herein includes not only a solid state having substantially no crystal lattice (periodical alignment of atoms) but a solid state showing periodical alignment of atoms to some extent but giving no clear X-ray diffraction pattern.

While not limiting, the average particle size of the positive or negative electrode active material is preferably from 0.03 to 50 μm. The particle size of the active material can be regulated by means of a known grinding machine or classifier, such as a mortar, a ball mill, a vibration ball mill, a planetary ball mill, a revolving stream type jet mill, and a sieve.

The thus obtained positive or negative electrode active material is considered as a compound capable of intercalating and deintercalating a lithium ion and changing the valence of the transition metal on charging and discharging. Accordingly, the mechanism of action of the negative electrode active material of the present invention fundamentally differs from that of a metallic negative electrode active material, such as metallic lithium or a lithium alloy, or a carbonaceous compound in that the mechanism of the metallic negative electrode active material consists in precipitation and dissolution of lithium on charging and discharging and that the carbonaceous compound does not clearly change the valency of carbon and is apt to cause metallic lithium to precipitate on charging due to the high conductivity.

If desired, the negative electrode active material according to the present invention may be used in combination with metallic lithium, a lithium alloy, such as Li-Al, Li-Al-Mn (see U.S. Pat. No. 4,820,599), Li-Al-Mg (JP-A-57-98977), Li-Al-Sn (see JP-A-63-6742) or Li-Al-In or Li-Al-Cd (see JP-A-1-144573), or a calcined carbonaceous compound capable of intercalating and deintercalating a lithium ion or metallic lithium (see JP-A-58-209864, JP-A-61-214417, JP-A-62-88269, JP-A-62-216170, JP-A-63-13282, JP-A-63-24555, JP-A-63-121247, JP-A-63-121257, JP-A-63-155568, JP-A-63-276873, JP-A-63-314821, JP-A-1-204361, JP-A-1-221859, and JP-A-1-274360).

The purpose of the combined use of metallic lithium or a lithium alloy is to insert a lithium ion within a cell but not to utilize a dissolution or precipitation reaction of metallic lithium, etc. as a battery reaction.

The electrode material mixture which can be used in the present invention comprises a conducting agent, a binder, a filler, and so forth.

The conducting agent may be any electron-conducting material which does not undergo any chemical change in an assembled battery. Suitable conducting agents include natural graphite (flake graphite, lumpy graphite, amorphous graphite, etc.), artificial graphite, carbon black, acetylene black, Ketjen black, carbon fiber, metal powders (e.g., copper, nickel, aluminum or silver powder, see JP-A-63-48554)), metallic fibers, polyphenylene derivatives (see JP-A-59-20971), and mixtures of two or more thereof. A combination of graphite and acetylene black is particularly preferred.

While not limiting, the conducting agent is preferably used in an amount of from 1 to 50% by weight, and more preferably from 2 to 30% by weight, based on the total weight of the electrode material mixture. Carbon or graphite is preferably used in an amount of from 2 to 15% by weight.

The electrolyte generally comprises a solvent and a lithium salt (composed of an anion and a lithium cation) soluble in the solvent. Suitable solvents include aprotic organic solvents, such as propylene carbonate, ethylene carbonate, butylene carbonate, dimethyl carbonate, diethyl carbonate, $\gamma$-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, ethyl monoglyme, phosphoric triesters (see JP-A-60-23973), trimethoxymethane (see JP-A-61-4170), dioxolane derivatives (see JP-A-62-15771, JP-A-62-22372 and JP-A-62-108474), sulforane (see JP-A-62-31959), 3-methyl-2-oxazolidinone (see JP-A-62-44961), propylene carbonate derivatives (see JP-A-62-290069 and JP-A-62-290071), tetrahydrofuran derivatives (see JP-A-63-32872), ethyl ether (see JP-A-63-62166), and 1,3-propanesultone (see JP-A-63-102173). These solvents may be used either individually or in combination of two or more thereof.

Suitable anions of lithium salts soluble in these solvents include $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}Cl_{10}^{2-}$ (see JP-A-57-74974), (1,2-dimethoxyethane)$_2ClO_4^-$ (see JP-A-57-74977), lower aliphatic carboxylic acid ions (see JP-A-60-41773), $AlCl_4^-$, $Cl^-$, $Br^-$, $I^-$ (see JP-A-60-247265), anions of chloroborane compounds (see JP-A-61-165957), and a tetraphenylboric acid ion (see JP-A-61-214376). These anions may be used either individually or in combination of two or more thereof. A particularly preferred electrolyte is a solution of LiCF$_3$SO$_3$, LiClO$_4$, LiBF$_4$ and/or LiPF$_6$ in a mixed solvent of propylene carbonate or ethylene carbonate and 1,2-dimethoxyethane and/or diethyl carbonate.

The amount of the electrolyte to be used in a battery is appropriately selected depending on the amount of a positive or negative electrode active material or the size of the battery.

The mixing ratio of the mixed solvent is not particularly limited. In the case of using a mixture of propylene carbonate (or ethylene carbonate) and 1,2-dimethoxyethane (and/or diethyl carbonate), a preferred mixing ratio is from 0.4:0.6 to 0.6:0.4 by volume. In the case of using both 1,2-dimethoxyethane and diethyl carbonate, a preferred mixing ratio thereof is from 0.4:0.6 to 0.6:0.4 by volume.

While not limiting, the concentration of the supporting electrolyte is preferably from 0.2 to 3 mols per liter of the electrolytic solution.

In addition to electrolytic solutions, inorganic or organic solid electrolytes may also be employed.

Examples of suitable inorganic solid electrolytes include a lithium nitride, a lithium halide, and a lithium oxyacid salt. Among them preferred are Li$_3$N, LiI, Li$_5$NI$_2$, Li$_3$N-LiI-LiOH, LiSiO$_4$, LiSiO$_4$-LiI-LiOH (see JP-A-49-81899), xLi$_3$PO$_4$-(1-x)Li$_4$SiO$_4$ (see JP-A-59-60866), Li$_2$SiS$_3$ (see JP-A-60-501731), and phosphorus sulfide compounds (see JP-A-62-82665).

Examples of suitable organic solid electrolytes include polyethylene oxide derivatives or polymers containing the same (see JP-A-63-135447), polypropylene oxide derivatives or polymers containing the same, polymers containing an ionizing group (see JP-A-62-254302, JP-A-62-254303, and JP-A-63-193954), a mixture of a polymer containing an ionizing group and the above-mentioned aprotic electrolytic solution (see U.S. Pat. Nos. 4,792,504 and 4,830,939, JP-A-62-22375, JP-A-62-22376, JP-A-63-22375, JP-A-63-22776, and JP-A-1-95117), phosphoric ester polymers (see JP-A-61-256573), high polymer matrix materials containing an aprotic polar solvent (see U.S. Pat. No. 4,830,939, JP-A-63-239779, JP-A-3-236104, JP-A-3-276508), and polyacrylonitrile added to an electrolytic solution (see JP-A-62-278774). A combined use of an organic solid electrolyte and an inorganic solid electrolyte is also known (see JP-A-60-1768).

As a separator, an insulating thin film having high ion permeability and prescribed mechanical strength is used. Such a thin film includes a sheet or nonwoven fabric made of an olefin polymer (e.g., polypropylene or polyethylene) or glass fiber from the standpoint of organic solvent resistance and hydrophobic properties. The pore size of the separator is selected from the range generally used for batteries, e.g., from 0.01 to 10 $\mu$m. The thickness of the separator is selected from the range generally used for batteries, e.g., from 5 to 300 $\mu$m.

For the purpose of improving charge and discharge characteristics, the electrolyte may contain other compounds, such as pyridine (see JP-A-49-108525), triethyl phosphite (see JP-A-47-4376), triethanolamine (see JP-A-52-72425), a cyclic ether (see JP-A-57-152684), ethylenediamine (see JP-A-58-87777), n-glyme (see JP-A-58-87778), hexaphosphoric acid triamide (see JP-A-58-87779), a nitrobenzene derivative (see JP-A-58-214281), sulfur (see JP-A-59-8280), a quinoneimine dye (see JP-A-59-68184), an N-substituted oxazolidinone and an N,N'-substituted imidazolidinone (see JP-A-59-154778), an ethylene glycol dialkyl ether (see JP-A-59-205167), a quaternary ammonium salt (see JP-A-60-30065), polyethylene glycol (see JP-A-60-41773), pyrrole (see JP-A-60-79677), 2-methoxyethanol (see JP-A-60-89075), AlCl$_3$ (see JP-A-61-88466), a monomer providing a conductive polymeric electrode active material (see JP-A-61-161673), triethylene phosphoramide (see JP-A-61-208758), a trialkylphosphine (JP-A-62-80976), morpholine (see JP-A-62-80977), an aryl compound having a carbonyl group (see JP-A-62-86673), a crown ether, e.g., 12-crown-4 (see *Physical Review*, B, Vol. 42, p. 6424 (1990)), hexamethylphosphoric triamide and a 4-alkylmorpholine (see JP-A-62-217575), a bicyclic tertiary amine (see JP-A-62-217578), an oil (see JP-A-62-287580), a quaternary phosphonium salt (see JP-A-63-121268), and a tertiary sulfonium salt (see JP-A-63-121269).

In order to make an electrolytic solution incombustible, a halogen-containing solvent, such as carbon tetrachloride or trifluorochloroethylene, may be added to the electrolytic solution (see JP-A-48-36632). In order to make an electrolytic solution suitable to high-temperature preservation, carbonic acid gas may be added thereto (see JP-A-59-134567).

The positive or negative electrode material mixture may contain an electrolytic solution or an electrolyte. For example, it is known to add the above-mentioned ion-conductive polymer or nitromethane (see JP-A-48-36633) or an electrolytic solution (see JP-A-57-124870) to the electrode material mixture.

The surface of the positive electrode active material may be modified by treating with an esterification agent (see JP-A-55-163779), a chelating agent (see JP-A-55-163780), a conducting high polymer (see JP-A-58-163188 and JP-A-59-14274), polyethylene oxide (see JP-A-60-97561), and the like.

The surface of the negative electrode active material may also be modified by, for example, providing a layer comprising an ion-conductive polymer or polyacetylene (see JP-A-58-111276) or treating with LiCl (see JP-A-58-142771).

A collector for an electrode active material may be made of any electron-conducting substance which undergoes no chemical change in an assembled battery. Suitable materials of a positive electrode collector include stainless steel, nickel, aluminum, titanium, calcined carbon; and aluminum or stainless steel with its surface treated with carbon, nickel, titanium or silver. Suitable materials of a negative electrode collector include stainless steel, nickel, copper, titanium, aluminum, calcined carbon; copper or stainless steel with its surface treated with carbon, nickel, titanium or silver; and an Al-Cd alloy. These materials may be subjected to surface oxidation. The collector may have a variety of forms, such as a foil, a film, a sheet, a net, a punched sheet, a lath, a porous body, a foamed body, a fibrous body, and so on. While not limiting, the thickness of the collector is from 1 to 500 $\mu$m.

The battery according to the present invention may have any shape, such as a coin shape, a button shape, a sheet shape, a cylindrical shape, and an angular shape.

A battery having a coin shape or a button shape is generally produced by compressing a positive or negative active material mixture into a pellet having prescribed thickness and diameter according to the size of the battery. A battery having a sheet shape, a cylindrical shape or an angular shape is generally produced by coating a positive or negative active material mixture on a collector, followed by drying and compressing. Coating is effected by any of general coating methods, such as reverse roll coating, direct roll coating, blade coating, knife coating, extrusion, curtain coating, gravure coating, bar coating, dip coating, and squeeze coating, with blade coating, knife coating and extrusion being preferred. The coating is preferably carried out at a speed of from 0.1 to 100 m/min. The coating method to be adopted is selected according to the physical properties and drying properties of the coating solution so as to obtain satisfactory surface properties. The thickness, length or width of the coating layer are decided according to the size of the battery. In particular, the dry thickness (thickness after compression) is preferably selected from the range 1 to 2000 $\mu$m.

The negative or positive electrode material mixture is preferably prepared by mixing powdered materials, such as an active material, a conducting agent, and a binder, with (wet mixing) or without (dry mixing) water or an organic solvent. The binder may previously be dissolved or dispersed in a solvent. Suitable mixing machines include a mortar, a mixer, a homogenizer, a dissolver, a sand mill, a paint shaker, a kneader, and a dynomill.

Drying or dehydration of a compressed pellet or sheet is conducted by a general means, preferably hot air, vacuum, infrared rays, far infrared rays, electron rays, and low humidity air, either alone or in combination thereof. The drying temperature preferably ranges from 80° to 350° C., and more preferably from 100° to 250° C. From the viewpoint of charge and discharge cycle characteristics, drying is preferably effected so such an extent that the positive and negative electrode material mixtures and the electrolyte may each have a water content of not more than 500 ppm, with the total battery water content being not more than 2000 ppm.

Compression into a pellet or a sheet may be carried out by a generally employed means, and preferably by pressing in a mold or calendering. The pressing pressure is preferably from 0.2 to 3 t/cm$^2$. The pressing speed in calendering is preferably from 0.1 to 50 m/min. The pressing temperature is preferably from room temperature to 200° C.

In assembling a battery, a sheet of an electrode material mixture is inserted into a battery case in a rolled or folded form. The sheet and the case are electrically connected, and an electrolytic solution is poured into the case. The case is sealed with a sealing top to complete a battery. A safety valve may be used as a sealing top. Various known safety elements may also be provided. For example, a fuse, a bimetal, a PTC element, etc. may be used as an element for prevention of overcurrent. In addition to a safety valve, an increase in inner pressure may be coped with by making cuts on a battery case, making cracks in a gasket, or making cracks in a sealing top. A countermeasure for overcharge or overdischarge may be incorporated into a charging machine.

A battery case and a lead-out plate are made of an electrically conductive metal or alloy, such as iron, nickel, titanium, chromium, molybdenum, copper, aluminum, and alloys thereof. The cap, case, sheet and lead can be joined by a known welding technique, such as direct current or alternating current electric welding, laser welding or ultrasonic welding. The sealing top can be sealed with a known sealing compound, such as asphalt.

The present invention will now be illustrated in greater detail with reference to Examples, but the present invention should not be construed as being limited thereto. All the parts are by weight unless otherwise indicated.

EXAMPLE 1

A negative electrode active material comprising a lithium-containing transition metal oxide was prepared by calcining the mixture shown in Table 1 below under the conditions shown.

TABLE 1

| Negative Electrode Active Material | Starting Mixture | Calcining Conditions |
|---|---|---|
| (a) | Li$_2$CO$_3$, CoO, and V$_2$O$_5$ | 750° C. × 18 hrs in air |

TABLE 1-continued

| Negative Electrode Active Material | Starting Mixture | Calcining Conditions |
|---|---|---|
| (b)* | (a) CoO and $V_2O_5$ | 800° C. × 12 hrs in air |
| | (b) $Li_2CO_3$ and $V_2O_5$ | 650° C. × 10 hrs in air |
| (c) | $Li_2CO_3$, $NH_4VO_3$, and $NiCO_3 \cdot 2Ni(OH)_2 \cdot 4H_2O$ | 800° C. × 6 hrs in air |
| (d) | $LiOH \cdot 2H_2O$, $NH_4VO_3$, and $(NH_4)_2TiO(C_2O_4)_2 \cdot 2H_2O$ | 800° C. × 6 hrs in air |
| (e) | $LiOH \cdot 2H_2O$, $NH_4VO_3$, and $MnCO_3$ | 750°C. × 180 hrs in air |

Note:
*: Mixture (a) was first calcined at the conditions shown. Material (b) was then added to the calcined product, and the mixture was further calcined at the conditions shown.

A mixture consisting of 86 parts of each of the negative electrode active materials (a) to (e), 3 parts of acetylene black and 6 parts of graphite as conducting agents, and 4 parts of the polymer shown in Table 2 below and 1 part of carboxymethyl cellulose as binders was kneaded together with water. The resulting aqueous slurry was coated on both sides of a 18 μm thick copper foil with a doctor blade, dried, and compressed by means of a calender press to prepare negative electrode sheet (2) in a band form having a thickness of 124 μm.

Separately, a mixture consisting of 87 parts of $LiCoO_2$ as a positive electrode active material, 9 parts of graphite as a conducting agent, and 3 parts of the polymer shown in Table 2 and 1 parts of sodium polyacrylate as binders was kneaded together with water. The resulting aqueous slurry was coated on both sides of a 20 μm thick aluminum foil support (collector), dried, and compressed by means of a calender press to prepare positive electrode sheet (1) in a band form having a thickness of 220 μm.

Positive electrode sheet (1), separator comprising a finely porous polypropylene film (Cell Guard) (3), negative electrode sheet (3), and separator were laminated in this order, and the laminate was rolled up. The roll was put in closed-end cylindrical case (4) made of nickel-plated iron which also served as a negative electrode terminal. A 1 mol/l solution of $LiBF_4$ in an equal volume mixture of propylene carbonate and 1,2-dimethoxyethane was poured into the case as an electrolytic solution. Battery cover (5) with a positive electrode terminal was fitted to the top of case (4) via gasket (6) to complete a cylindrical battery. Positive electrode terminal (5) was previously connected to positive electrode sheet (1) with a lead terminal, and battery case (4) to negative electrode sheet (3), respectively. A cross section of the resulting battery is shown in the figure. Numeral 7 is a safety valve.

The ratio of the area where the electrode material mixture fell off the respective electrode sheet during rolling of the laminate based on the total sheet area was measured to obtain a fall-off area ratio.

The resulting battery was charged to 4.1 v at a current density of 1 mA/cm² and then discharged to 1.8 v. The charge and discharge cycle was repeated, and the number of cycles at which the discharge capacity was reduced to 60% of the initial level was taken as a charge and discharge cycle life.

The results of measurements are shown in Table 2.

TABLE 2

| Sample No. | Negative Electrode Active Material | Negative Electrode Binder | Positive Electrode Binder | Fall-Off Area Ratio Negative Electrode (%) | Fall-Off Area Ratio Positive Electrode (%) | Charge and Discharge Cycle Life | Remark |
|---|---|---|---|---|---|---|---|
| 101 | a | A-1 | A-1 | 0 | 0 | 510 | Invention |
| 102 | b | " | " | " | " | 470 | " |
| 103 | c | " | " | " | " | 430 | " |
| 104 | d | " | " | " | " | 400 | " |
| 105 | e | " | " | " | " | 450 | " |
| 106 | a | A-2 | A-3 | " | " | 530 | " |
| 107 | a | A-4 | A-5 | " | " | 500 | " |
| 108 | a | A-6 | A-7 | " | " | 490 | " |
| 109 | c | A-2 | A-5 | " | " | 440 | " |
| 110 | e | A-15 | A-20 | " | " | 480 | " |
| 111 | a | A-17 | B-1 | " | 8 | 400 | " |
| 112 | a | B-1 | A-1 | 10 | 0 | 390 | " |
| 113 | a | B-1 | B-1 | 10 | 8 | 290 | Comparison |
| 114 | a | A-1 | EPDM* | 0 | 13 | 350 | Invention |
| 115 | a | EPDM | A-1 | 11 | 0 | 330 | " |

Note:
*Ethylene-propylene-cyclic diene copolymer

EXAMPLE 2

A mixture consisting of 87 parts of $LiCoVO_4$ (prepared by calcining lithium carbonate, cobalt oxide, and vanadium pentoxide in air at 1000° C. for 24 hours) as a negative electrode active material, 9 parts of acetylene black as a conducting agent, and 4 parts of the polymer shown in Table 3 below as a binder was kneaded together with an appropriate solvent, such as toluene or N-methylpyrrolidone. The resulting slurry was coated on both sides of a 20 μm thick copper foil (collector), dried, and compressed by means of a roller press to obtain a negative electrode sheet having a thickness of 200 μm.

Separately, a mixture consisting of 88 parts of $LiCoO_2$ as a positive electrode active material, 9 parts of acetylene black as a conducting agent, and 3 parts of polymer C-3 as a binder together with an appropriate solvent, such as toluene or N-methylpyrrolidone. The resulting slurry was coated on both sides of a 20 μm thick aluminum foil (collector), dried, and compressed by means of a roller press to prepare a positive electrode sheet having a thickness of 220 μm.

The above-prepared negative electrode sheet and positive electrode sheet were assembled into a cylindrical battery in the same manner as in Example 1.

A fall-off area ratio of the positive electrode material mixture was determined in the same manner as in Example 1. The resulting battery was subjected to a charge and discharge cycle test at a current density of 1 mA/cm², a final charge voltage of 3.6 v, and a final discharge voltage of 1.8 v, and the number of cycles at which the discharge capacity was reduced to 60% of the initial level was taken as a charge and discharge cycle life. The results obtained are shown in Table 3.

TABLE 3

| Sample No. | Negative Electrode Binder | Fall-off Area Ratio (%) | Charge and Discharge Cycle Life | Remark |
|---|---|---|---|---|
| 201 | C-1 | 0 | 900 | Invention |
| 202 | C-2 | 0 | 790 | " |
| 203 | C-3 | 0 | 920 | " |
| 204 | C-4 | 0 | 740 | " |
| 205 | C-5 | 0 | 680 | " |
| 206 | C-6 | 0 | 650 | " |
| 207 | C-7 | 0 | 840 | " |
| 208 | C-10 | 0 | 690 | " |
| 209 | C-11 | 0 | 800 | " |
| 210 | C-13 | 0 | 710 | " |
| 211 | C-14 | 0 | 670 | " |
| 212 | C-16 | 0 | 850 | " |
| 213 | a* | 4 | 510 | Comparison |
| 214 | b** | 10 | 390 | " |
| 215 | c*** | 7 | 460 | " |

Note:
*: Ethylene-propylene-cyclic diene copolymer
**: Polyvinylidene fluoride
***: Trifluorochloroethylene-vinylidene fluoride copolymer

EXAMPLE 3

A negative electrode sheet and a positive electrode sheet were prepared in the same manner as in Example 2, except for using the polymer shown in Table 4 below as a binder for the negative electrode and using polymer D-3 as a binder for the positive electrode.

The resulting negative and positive electrode sheets were assembled into a cylindrical battery in the same manner as in Example 1. A total fall-off area ratio of the positive electrode material mixture and a charge and discharge cycle life were determined in the same manner as in Example 2. The results obtained are shown in Table 4.

TABLE 4

| Sample No. | Negative Electrode Binder | Fall-off Area Ratio (%) | Charge and Discharge Cycle Life | Remark |
|---|---|---|---|---|
| 301 | D-1 | 0 | 920 | Invention |
| 302 | D-2 | 0 | 780 | " |
| 303 | D-3 | 0 | 940 | " |
| 304 | D-4 | 0 | 710 | " |
| 305 | D-5 | 0 | 670 | " |
| 306 | D-6 | 0 | 640 | " |
| 307 | D-7 | 0 | 830 | " |
| 308 | D-10 | 0 | 610 | " |
| 309 | D-11 | 0 | 870 | " |
| 310 | D-13 | 0 | 700 | " |
| 311 | D-14 | 0 | 600 | " |
| 312 | D-16 | 0 | 880 | " |
| 313 | a | 4 | 510 | Comparison |
| 314 | b | 10 | 330 | " |
| 315 | c | 7 | 460 | " |

According to the present invention, the electrode active material can be effectively prevented from falling off by the specific binder, and there is provided a nonaqueous secondary battery having an extended charge and discharge cycle life and improved charge and discharge characteristics. The electrode using the binder of the present invention may be used either one or both of a positive electrode and a negative electrode.

While the invention has been described in detail and with reference to specific examples thereof, it will be apparent to one skilled in the art that various changes and modifications can be made therein without departing from the spirit and scope thereof.

What is claimed is:

1. A nonaqueous secondary battery comprising a positive electrode active material, a negative electrode active material, and an electrolyte having ionic conductivity, said battery containing, as a binder, a carboxyl-modified styrene-butadiene copolymer in the positive electrode material mixture thereof and/or the negative electrode material mixture thereof and using at least one chalcogen compound of a transition metal as a positive electrode active material and at least one chalcogen compound of a transition metal as a negative electrode active material.

2. A nonaqueous secondary battery as claimed in claim 1, wherein said carboxyl-modified styrene-butadiene copolymer has a carboxyl content of from 0.01 to 7 mmol per gram and a styrene to butadiene weight ratio of from 10:90 to 70:30.

3. A nonaqueous secondary battery as claimed in claim 1, wherein said chalcogen compound of a transition metal as a negative electrode active material is a lithium-containing transition metal oxide.

4. A nonaqueous secondary battery as claimed in claim 3, wherein said lithium-containing transition metal oxide is represented by formula $Li_pM_qV_{1-q}O_r$, wherein M represents a transition metal; p is from 0.4 to 11; q is from 0 to 1; and r is from 1.2 to 5.5.

5. A nonaqueous secondary battery as claimed in claim 3, wherein said lithium-containing transition metal oxide is represented by formula $Li_pCO_qV_{1-q}O_r$, wherein p is from 0.4 to 11; q is from 0 to 1; and r is from 1.2 to 5.5.

6. A nonaqueous secondary battery as claimed in claim 5, wherein said lithium-containing transition metal oxide as a positive electrode is represented by formula $Li_xM_yO_z$, wherein M represents at least one of Ti, V, Cr, Mn, Fe, Co, Ni, Mo, and W; x is from 0.6 to 2.1; y is 1 or 2; and z is from 1.5 to 5.

7. A nonaqueous secondary battery comprising a positive electrode active material, a negative electrode active material, and an electrolyte having ionic conductivity, said battery containing, as a binder, a polymer represented by formula (I) shown below in the positive electrode material mixture thereof and/or the negative electrode material mixture thereof and using at least one chalcogen compound of a transition metal as a positive electrode active material and at least one chalcogen compound of a transition metal as a negative electrode active material:

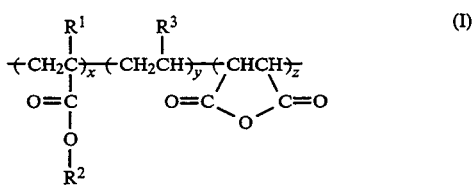

wherein $R^1$ represents a hydrogen atom or an alkyl group having 1 or 2 carbon atoms; $R^2$ represents an alkyl group having from 1 to 12 carbon atoms, an aryl group having from 6 to 12 carbon atoms or an aralkyl group having from 7 to 13 carbon atoms; $R^3$ represents a hydrogen atom or an alkyl group having 1 or 2 carbon atoms; x is from 5 to 40% by weight; y is from 40 to 90% by weight; and z is from 1 to 20% by weight; with the sum of x, y, and z being 100% by weight.

8. A nonaqueous secondary battery as claimed in claim 7, wherein said chalcogen compound of a transition metal as a negative electrode active material is a lithium-containing transition metal oxide.

9. A nonaqueous secondary battery as claimed in claim 8, wherein said lithium-containing transition metal oxide is represented by formula $Li_pM_qV_{1-q}O_r$, wherein M represents a transition metal; p is from 0.4 to 11; q is from 0 to 1; and r is from 1.2 to 5.5.

10. A nonaqueous secondary battery as claimed in claim 8, wherein said lithium-containing transition metal oxide is represented by formula $Li_pCo_qV_{1-q}O_r$, wherein p is from 0.4 to 11; q is from 0 to 1; and r is from 1.2 to 5.5.

11. A nonaqueous secondary battery as claimed in claim 10, wherein said lithium-containing transition metal oxide as a positive electrode is represented by formula $Li_xM_yO_z$, wherein M represents at least one of Ti, V, Cr, Mn, Fe, Co, Ni, Mo, and W; x is from 0.6 to 2.1; y is 1 or 2; and z is from 1.5 to 5.

12. A nonaqueous secondary battery comprising a positive electrode active material, a negative electrode active material, and an electrolyte having ionic conductivity, said battery containing, as a binder, a polymer represented by formula (II) shown below in the positive electrode material mixture thereof and/or the negative electrode material mixture thereof and using at least one chalcogen compound of a transition metal as a positive electrode active material and at least one chalcogen compound of a transition metal as a negative electrode active material:

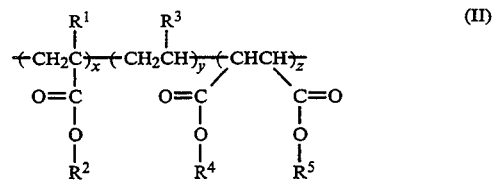

wherein $R^1$ represents a hydrogen atom or an alkyl group having 1 or 2 carbon atoms; $R^2$ represents an alkyl group having from 1 to 12 carbon atoms, an aryl group having from 6 to 12 carbon atoms or an aralkyl group having from 7 to 13 carbon atoms; $R^3$ represents a hydrogen atom or an alkyl group having 1 or 2 carbon atoms; $R^4$ and $R^5$, which may be the same or different, each represent a hydrogen atom, an alkyl group having from 1 to 12 carbon atoms, an aryl group having from 6 to 12 carbon atoms or an aralkyl group having from 7 to 13 carbon atoms; x is from 5 to 40% by weight; y is from 40 to 90% by weight; and z is from 1 to 20% by weight; with the sum of x, y, and z being 100% by weight.

13. A nonaqueous secondary battery as claimed in claim 12, wherein said chalcogen compound of a transition metal as a negative electrode active material is a lithium-containing transition metal oxide.

14. A nonaqueous secondary battery as claimed in claim 13, wherein said lithium-containing transition metal oxide is represented by formula $Li_pM_qV_{1-q}O_r$, wherein M represents a transition metal; p is from 0.4 to 11; q is from 0 to 1; and r is from 1.2 to 5.5.

15. A nonaqueous secondary battery as claimed in claim 13, wherein said lithium-containing transition metal oxide is represented by formula $Li_pCo_qV_{1-q}O_r$, wherein p is from 0.4 to 11; q is from 0 to 1; and r is from 1.2 to 5.5.

16. A nonaqueous secondary battery as claimed in claim 15, wherein said lithium-containing transition metal oxide as a positive electrode as a positive electrode is represented by formula $Li_xM_yO_z$, wherein M represents at least one of Ti, V, Cr, Mn, Fe, Co, Ni, Mo, and W; x is from 0.6 to 2.1; y is 1 or 2; and z is from 1.5 to 5.

* * * * *